US009753658B2

(12) United States Patent
Beeson et al.

(10) Patent No.: US 9,753,658 B2
(45) Date of Patent: Sep. 5, 2017

(54) SYSTEM AND METHOD FOR DIVIDING AND SYNCHRONIZING A PROCESSING TASK ACROSS MULTIPLE PROCESSING ELEMENTS/PROCESSORS IN HARDWARE

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: Concurrent Ventures, LLC, Johns Creek, GA (US)

( * ) Notice: Subject to any disclaimer, the term of this patent is extended or adjusted under 35 U.S.C. 154(b) by 0 days.

(21) Appl. No.: 14/952,320

(22) Filed: Nov. 25, 2015

(65) Prior Publication Data

US 2016/0077754 A1    Mar. 17, 2016

Related U.S. Application Data

(63) Continuation of application No. 14/585,003, filed on Dec. 29, 2014, now Pat. No. 9,201,597, which is a
(Continued)

(51) Int. Cl.
*G06F 3/06* (2006.01)
*G06F 9/52* (2006.01)

(52) U.S. Cl.
CPC ............ *G06F 3/0619* (2013.01); *G06F 3/061* (2013.01); *G06F 3/065* (2013.01); *G06F 3/067* (2013.01);
(Continued)

(58) Field of Classification Search
CPC ........ G06F 3/06; G06F 3/0656; G06F 3/0659; G06F 3/067; G06F 5/06; G06F 13/12; G06F 13/1673
See application file for complete search history.

(56) References Cited

U.S. PATENT DOCUMENTS 4,272,819 A * 6/1981 Katsumata .............. G06F 15/17
710/22
5,638,535 A * 6/1997 Rosenthal et al. ............ 711/165
(Continued)

FOREIGN PATENT DOCUMENTS

WO    WO 0010092         2/2000
WO    WO 0010092 A1 *   2/2000

OTHER PUBLICATIONS

'TRIPLE-DES/Data Management Synthesizable IP Core DES-DMGR' by Orchidee, (2009).*
(Continued)

*Primary Examiner* — Steven Snyder
(74) *Attorney, Agent, or Firm* — Womble Carlyle Sandridge & Rice LLP

(57) ABSTRACT

A shared counter resource, such as a register, is disclosed in the hardware, where the register representing how much free space there is in the command queue is accessible to one or more processing elements. When a processing element reads the "reservation" register, the hardware automatically decrements the available free space by a preconfigured amount (e.g., 1) and returns the value of the free space immediately prior to the read/reservation. If the read returns 0 (or a number less than the preconfigured amount), there was insufficient free space to satisfy the request. In the event there was insufficient space to satisfy the request the reservation register may be configured to reserve however much space was available or to not reserve any space at all. Any number of processing elements may read these registers and various scenarios are described where the input and output queues are accessible via various processing elements.

20 Claims, 5 Drawing Sheets

Related U.S. Application Data continuation of application No. 14/099,844, filed on Dec. 6, 2013, now Pat. No. 8,924,596.

(52) U.S. Cl.
CPC .......... *G06F 3/0644* (2013.01); *G06F 3/0659* (2013.01); *G06F 9/52* (2013.01); *G06F 2209/548* (2013.01)

(56) References Cited

U.S. PATENT DOCUMENTS

| | | | |
|---|---|---|---|
| 5,696,990 A * | 12/1997 | Rosenthal et al. | 710/29 |
| 5,740,406 A * | 4/1998 | Rosenthal et al. | 711/169 |
| 5,805,930 A * | 9/1998 | Rosenthal et al. | 710/57 |
| 5,924,126 A * | 7/1999 | Rosenthal et al. | 711/207 |
| 6,081,854 A * | 6/2000 | Priem et al. | 710/37 |
| 7,836,230 B1 * | 11/2010 | Wong | G06F 3/061 710/52 |
| 8,056,080 B2 | 11/2011 | Alexander et al. | |
| 8,640,140 B2 | 1/2014 | Waddington et al. | |
| 8,704,838 B2 * | 4/2014 | Fernando et al. | 345/505 |
| 8,730,248 B2 * | 5/2014 | Sasaki et al. | 345/503 |
| 8,990,821 B2 | 3/2015 | Blackburn et al. | |
| 9,274,859 B2 * | 3/2016 | Avkarogullari | G06F 9/544 |
| 2002/0097674 A1 * | 7/2002 | Balabhadrapatruni | H04L 12/2801 370/229 |
| 2004/0177496 A1 * | 9/2004 | Pellerin | B23P 21/004 29/783 |
| 2006/0221087 A1 * | 10/2006 | Diard | 345/505 |
| 2007/0011361 A1 * | 1/2007 | Okada | G06F 3/0619 710/8 |
| 2007/0016906 A1 | 1/2007 | Trauben et al. | |
| 2007/0288931 A1 * | 12/2007 | Avkarogullari | G06F 9/544 719/312 |
| 2008/0301697 A1 | 12/2008 | Southgate et al. | |
| 2010/0149195 A1 * | 6/2010 | Fernando et al. | 345/505 |

OTHER PUBLICATIONS

'Orchidee Core Technology' with a link to 'DES-DMGR', copyright 2009, Orchidee.*
'Structured Computer Organization' by Tanenbaum, pp. 10-11, copyright 1984.*
'NAS-SAN Comparison' from Zerowait corp, archived from Sep. 5, 2012.*
"TRIPLE-DES/Data Management Synthesizable IP Core DES-DMGR" by Orcidee, (2009).
International Search Report and the Written Opinion of the International Searching Authority, PCT/US2014/069153, mailed Mar. 23, 2015.
Notification of Transmittal of the International Search Report and the Written Opinion of the International Searching Authority, PCT/US2014/069153, mailed Mar. 23, 2015.

* cited by examiner

SYSTEM AND METHOD FOR DIVIDING AND SYNCHRONIZING A PROCESSING TASK ACROSS MULTIPLE PROCESSING ELEMENTS/PROCESSORS IN HARDWARE

BACKGROUND OF THE INVENTION

Field of Invention

The present invention relates generally to the field of load distribution. More specifically, the present invention is related to a system and method for dividing and synchronizing a processing task across multiple processing elements/processors in hardware.

Discussion of Related Art

In the prior art, the processing load (of a processing element) to determine what command to issue is relatively high. The processing load to determine what command to issue can be partially or fully offloaded to a multiplicity of other processing elements (e.g. processors, processor cores, or custom processing circuitry). However, this distribution of load causes commands to be determined from multiple processing elements. It can become a challenge to ensure the module command queues (FIFOs) are not overfilled, thus synchronization is required amongst the multiplicity of processing elements. In the prior art, such synchronization is performed using software techniques, such as semaphores and mutexes to a shared available space count variable in memory. However, this takes additional processing time, making this process non-optimal. To further compound the problem, there may be a need to keep the time from command issue to execution minimized, which tends to keep the command queue shallow.

Embodiments of the present invention are an improvement over prior art systems and methods.

SUMMARY OF THE INVENTION

In one embodiment, the present invention provides a system for dividing and synchronizing a processing task across a plurality of processing elements comprising: an input queue implemented in hardware; an output queue implemented in hardware; a first processing element having access to the input queue and the output queue; at least one second processing element in communication with the first processing element; a reservation register implemented in hardware storing a value indicative of available space in a command queue, the reservation register accessible by both the first processing element and the at least second processing element; computer storage storing instructions, which when executed by the at least one second processing element: accesses the reservation register and reads the stored value; determines when the read value indicates available space in the input queue for the first processing element to issue a command; notifies the first processing element to issue the command to the input queue; and wherein the first processing element receives notification from the at least second processing element regarding issuing the command, issues the command to the input queue, and receives a response corresponding to the command from the output queue.

In another embodiment, the present invention provides a system for dividing and synchronizing a processing task across a plurality of processing elements comprising: an input queue implemented in hardware; an output queue implemented in hardware; a first processing element having access to the input queue and the output queue; at least one second processing element in communication with the input queue; a reservation register implemented in hardware storing a value indicative of available space in a command queue, the reservation register accessible by both the first processing element and the at least second processing element; computer storage storing instructions, which when executed by the at least one second processing element: accesses the reservation register and reads the stored value; determines when the read value indicates available space in the input queue for the first processing element to issue a command; issue the command to the input queue; and wherein the first processing element receives a response corresponding to the command from the output queue.

In another embodiment, the present invention provides for a system for dividing and synchronizing a processing task across a plurality of processing elements comprising: an input queue implemented in hardware; an output queue implemented in hardware; a first processing element having access to the input queue and the output queue; at least one second processing element in communication with the input queue and the output queue; a reservation register implemented in hardware storing a value indicative of available space in a command queue, the reservation register accessible by both the first processing element and the at least second processing element; computer storage storing instructions, which when executed by the at least one second processing element: accesses the reservation register and reads the stored value; determines when the read value indicates available space in the input queue for the first processing element to issue a command; issue the command to the input queue; and receives a response corresponding to the command from the output queue.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
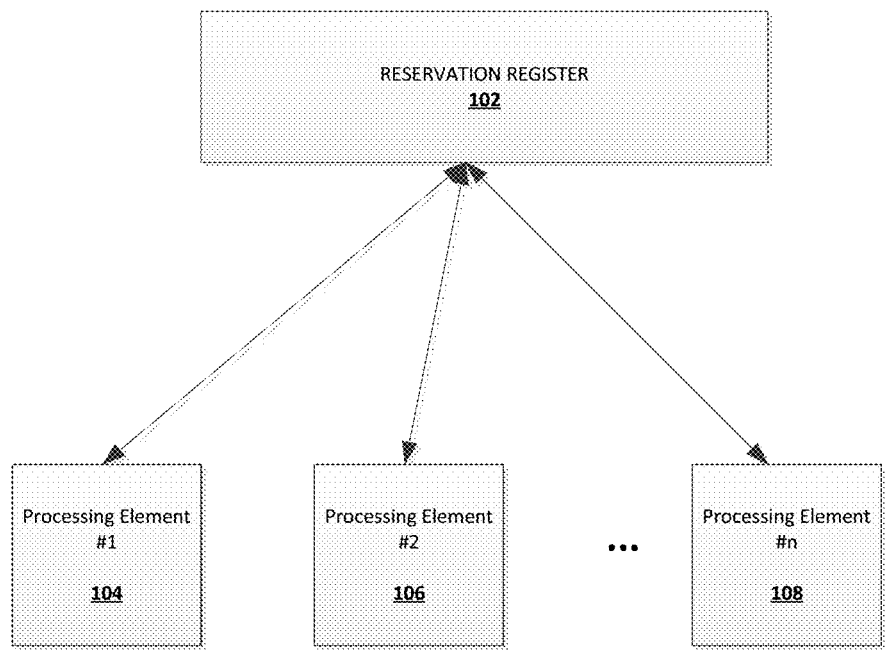
FIG. 1 depicts a non-limiting example of where the present invention's "reservation" register is accessible by a plurality of processing elements.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The invention considers the case where software must issue commands to a hardware module. In this case the processing load to determine what command to issue is relatively high, and there may also be additional background tasks necessary. The processing load to determine what command to issue can be partially or fully offloaded to a multiplicity of other processing elements (e.g. processors, processor cores, or custom processing circuitry). However, this distribution of load causes commands to be determined from multiple processing elements. It can become a challenge to ensure the module command queues (FIFOs) are not overfilled, thus synchronization is required amongst the multiplicity of processing elements. As noted above, in the prior art, this synchronization is performed using software techniques, such as semaphores and mutexes to a shared available space count variable. However, this takes additional processing time. To further compound the problem there may be a need to keep the time from command issue to execution minimized, which tends to keep the command queue shallow.

Figure 2:
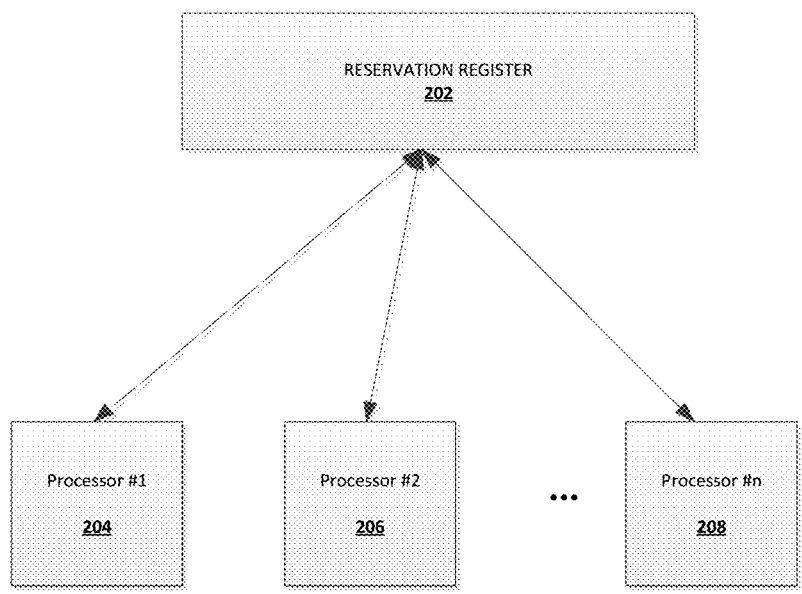
FIG. 2 depicts another non-limiting example of where the present invention's reservation register is accessible by a plurality of processors.

The present invention provides a shared counter resource (e.g., a register) in the hardware representing how much free space there is in the command queue, accessible to one or more processing elements. FIG. 1 depicts a non-limiting example of where the present invention's "reservation" register 102 is accessible by a plurality of processing elements 1 through n, 104 through 108. It should be noted that while the discussion herein references processing elements, the teachings of the present invention equally applies to disparate processors as well. For example, FIG. 2 depicts another non-limiting example of where the present invention's reservation register 202 is accessible by a plurality of processors 1 through n, 204 through 208.

When a processing element reads the "reservation" register, the hardware automatically decrements the available free space by a preconfigured amount (e.g., 1) and returns the value of the free space immediately prior to the read/reservation. If the read returns 0 (or a number less than the preconfigured amount), there is insufficient free space to satisfy the request. In the event there is insufficient space to satisfy the request the reservation register may be configured to reserve however much space is available or to not reserve any space at all. At times there may exist a need to test if a reservation would succeed without actually making a reservation, a "peek" at the reservation register. This peek may be implemented via an alternate, mirrored, reservation register that mirrors the value of the reservation register that can be read by a processing element, but does not actually make a reservation, whereby the alternate register does not automatically modify the available free space. Any number of processing elements may read these registers (hardware synchronizes these reads internally to ensure they do not overlap using standard arbitration for multiple processing elements). Thus there is a guarantee of not "over subscribing" the command queue. When commands actually are issued to the queue following a reservation, they will remain there until the hardware module or entity consuming those commands is able to process them, removing them from the queue. Once they are removed from the queue, the reservation free space will be incremented automatically by the hardware. This reservation technique allows for a fixed or variable time delay between making the reservation for space in the queue and actually issuing the command to the queue, and allows for different processing elements to make the decision(s) and to then issue the command(s). The reservation free space is different from the actual real time free space in the command queue, since space is "reserved" prior to actually being consumed by an issued command.

The software, therefore, need only read a register and check its return value to make a reservation and know if it was successful or not. All arbitration and mutual exclusion tasks between multiple processing elements are handled in hardware. There is no need for the software overhead of multiple processing elements handling the synchronization of a shared available space count variable in shared memory or otherwise.

In one embodiment there is a single processing element connected to the module's command queue. It is desired to have a single point of responsibility for this hardware module (such as a control interface to a storage processing element) to issue the commands and deal with the responses from the module. However, the processing load to determine all or a subset of commands to issue may be high. This processing load is placed on a separate processing element. The two processing elements communicate in some efficient way (such as through shared memory, etc.). Part of the processing load is to know that there is in fact available space for a command to be issued, thus this second processing element must have visibility to the available free command queue space in addition to the first processing element also having visibility. The second processing element may issue its commands directly or may return its decision back to the first processing element to be sequenced with any commands the first processing element is able to issue on its own, but even in such a scenario, the first processing element would have to make its own space reservations for those commands it is able to issue on its own. Therefore, any processing element that determines a command must first make a reservation prior to issuing the command or informing another processing element of the decision to issue a command. The hardware will then automatically, without software intervention, update the reserved free space when the command is actually removed from the queue for consumption. In the event space is reserved but later it is determined that space is not to be used (e.g., decided to not issue the command after space had been reserved), there may be a mechanism available to a processing element to return reserved space back to the pool (via another register action) making it available space again.

This mechanism need not be a "command" queue but any resource shared among a plurality of processing elements. For example, the mechanism may be used to implement a hardware-based mutex or hardware-based semaphore. The shared resource itself may be implemented in hardware, software, or a combination of the two. Though the reservations in the embodiments discussed reserve one entry in the queue at a time, this is not necessary, as it could be some other number (e.g., a plurality of commands, the amount of queue space consumed by a command, or some other number relevant to the shared resource). Such other numbers are within the scope of the present invention.

In the event a reservation fails, it would be possible for the hardware to internally and automatically queue (e.g., post) the attempt and generate an interrupt to the requesting processor element at some later point in time to indicate it was then successful, alleviating the requesting processing element from having to poll for space to be available.

Figure 3:
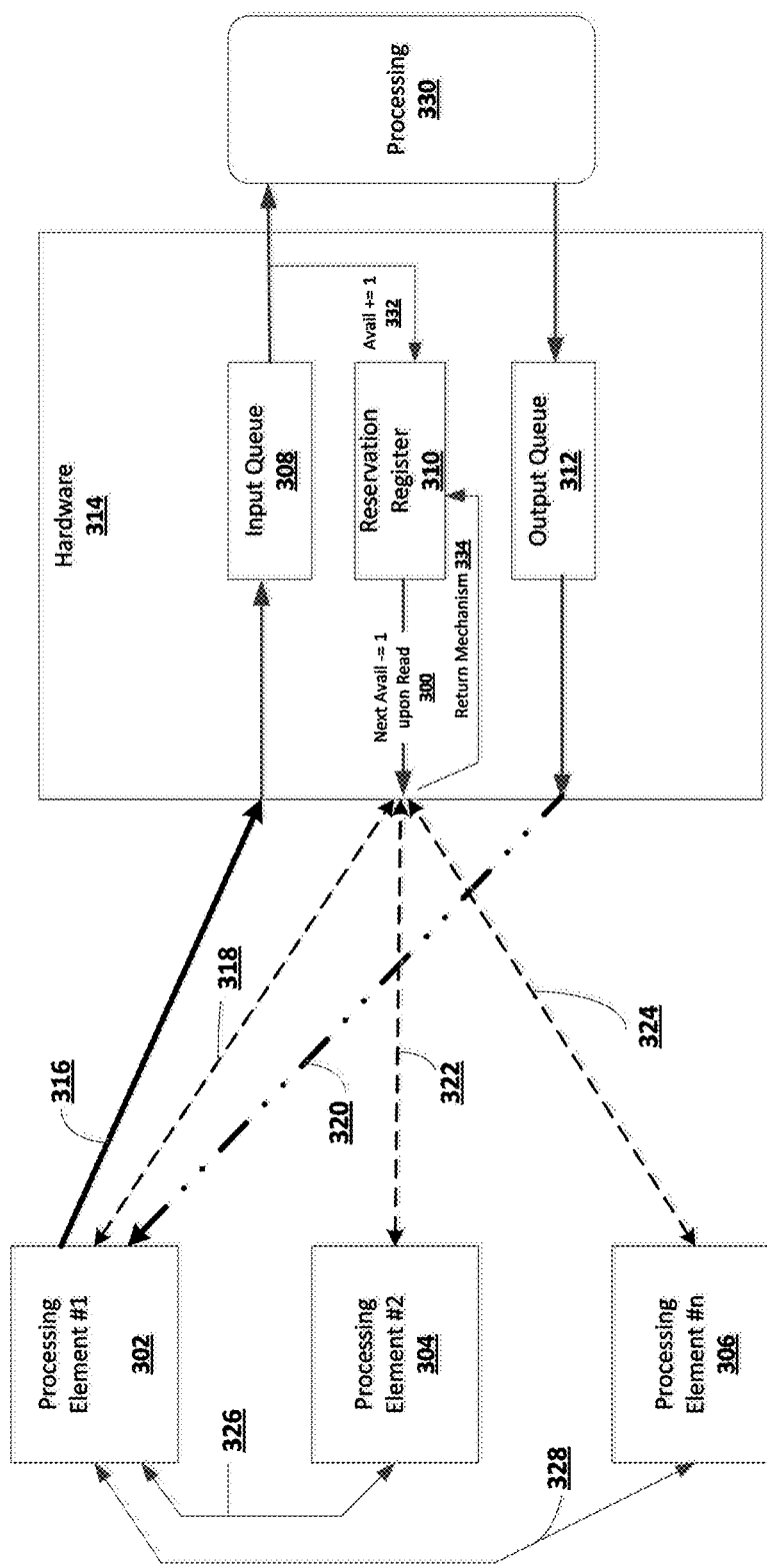
FIG. 3 through FIG. 5 depict the various embodiments of the present invention for dividing and synchronizing a processing task across a plurality of processing elements.

In one embodiment, as depicted in FIG. 3, the present invention provides a system for dividing and synchronizing a processing task across a plurality of processing elements comprising: an input queue 308 implemented in hardware 314; an output queue 312 also implemented in hardware 314; a first processing element 302 having access to the input queue 308 (over communication link 316) and the output queue 312 (over communication link 320); one or more additional processing elements (e.g., processing element #2—304 through processing element #n—306) in communication with the first processing element 302 (depicted by inter-processor communication link 326 between processing element #1 302 and processing element #2 304 and depicted by inter-processor communication link 328 between processing element #1 302 and processing element #n 306) (while FIG. 3 depicts a simplistic link 326 or 328 between two processing elements, it should be noted that there may be other components disposed along this path, where such components may not be used to limit the scope of the present invention); a reservation register 310 implemented in hardware 314 storing a value indicative of available space in input queue 308, the reservation register 310 accessible by both the first processing element 302 (over communication link 318) and one or more additional processing elements (e.g., processing element #2—304 through processing element #n—306) (e.g., over communication links 322 and 324); computer storage storing instructions, which when executed by one of the additional processing elements (e.g., processing element #2—304 through processing element #n—306): accesses the reservation register 310 and reads the stored value; the stored value automatically decremented in hardware by 1 in concert with the read to make a reservation of space 300; determines when the read value indicates available space in the input queue 308 for the first processing element 302 to issue a command; notifies the first processing element 302 to issue the command to the input queue 308; and wherein the first processing element 302 receives notification from one of the additional processing elements (e.g., processing element #2—304 through processing element #n—306) regarding issuing the command, issues the command to the input queue 308, and receives a response corresponding to the command from the output queue 312. In the event the first processing element 302 decides not to issue the command (e.g., overrides the decision to issue the command), it would return the space previously reserved for the command by writing to a reservation return register, depicted as the return mechanism 334, the amount of space it wishes to return (i.e. increments the reservation register 310 by this amount). Also shown in FIG. 3, another additional processing element 330 takes the command from the input queue 308 causing the reservation register to increase its available space automatically in hardware 332 by the amount of space now created based on the removal of the command from the input queue. The additional processing element 330 then executes the command and notifies the output queue 312 of the execution where it then issues the response to the first processing element 302. In one non-limiting example, the system is implemented as part of a storage area network (SAN) controller, providing the command queue for the commands the storage controller is to issue to a storage media device. In another non-limiting example, the system is implemented as part of a network attached storage (NAS) controller, providing the command queue for the commands the storage controller is to issue to a storage media device.

Figure 4:
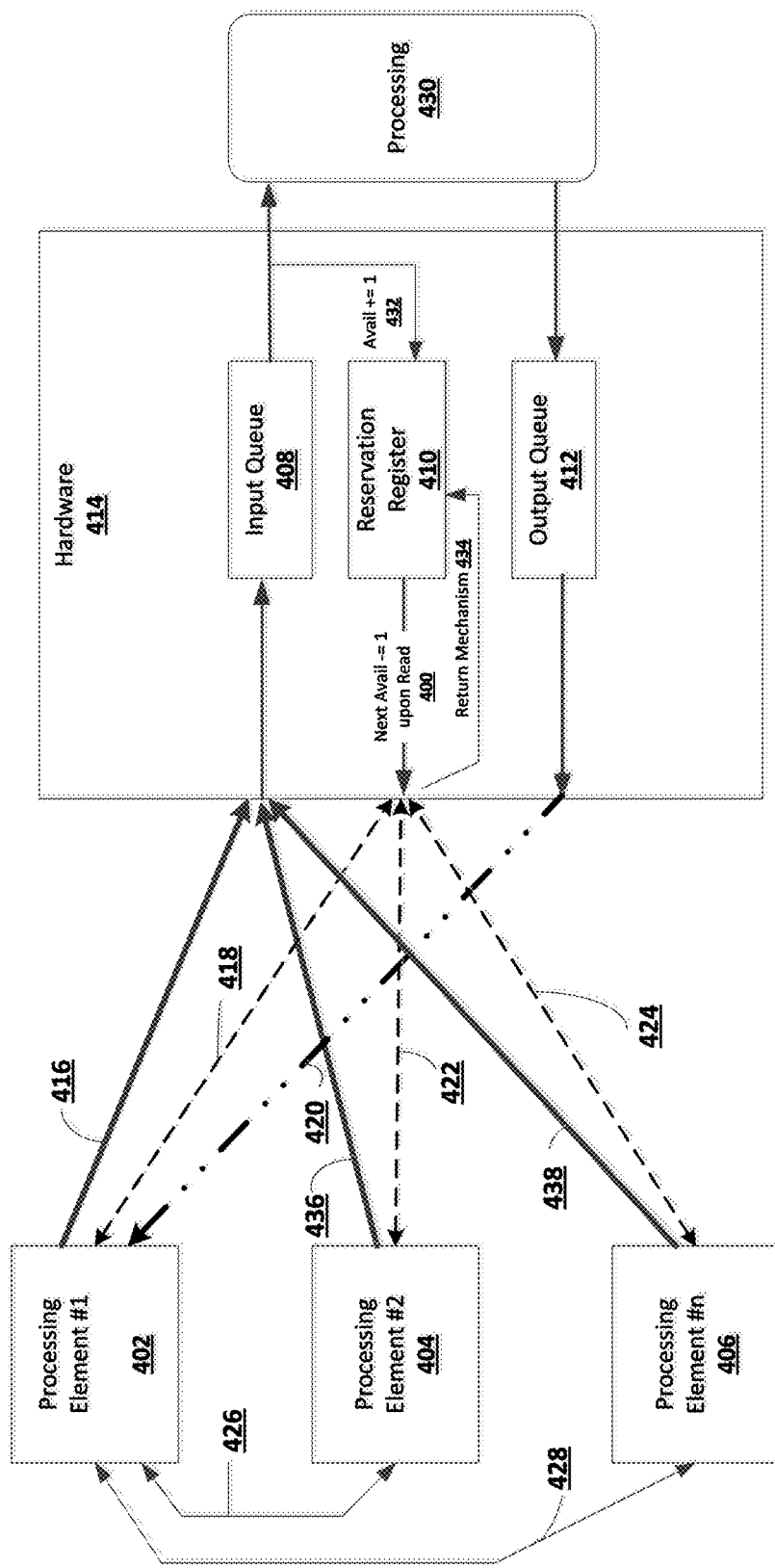

In one embodiment, as depicted in FIG. 4, the present invention provides a system for dividing and synchronizing a processing task across a plurality of processing elements comprising: an input queue 408 implemented in hardware 414; an output queue 412 also implemented in hardware 414; a first processing element 402 having access to the input queue 408 (over communication link 416) and the output queue 412 (over communication link 420); one or more additional processing elements (e.g., processing element #2—404 through processing element #n—406) optionally in communication with the first processing element 402 (depicted by inter-processor communication link 426 between processing element #1 402 and processing element #2 404 and depicted by inter-processor communication link 428 between processing element #1 402 and processing element #n 406) (while FIG. 4 depicts a simplistic link 426 or 428 between two processing elements, it should be noted that there may be other components disposed along this path, where such components may not be used to limit the scope of the present invention) and having access to the input queue 408 (over communication links 436 and 438); a reservation register 410 implemented in hardware 414 storing a value indicative of available space in input queue 408, the reservation register 410 accessible by both the first processing element 402 (over communication link 418) and one or more additional processing elements (e.g., processing element #2—404 through processing element #n —406) (e.g., over communication links 422 and 424); computer storage storing instructions, which when executed by one of the additional processing elements (e.g., processing element #2—404 through processing element #n—406): accesses the reservation register 410 and reads the stored value; the stored value automatically decremented in hardware by 1 in concert with the read to make a reservation of space 400; determines when the read value indicates available space in the input queue 408 to issue a command; issue the command to the input queue 408 (this may be optionally done on behalf of the first processing element 402 or the first processing element can issue the command (or another command) into the input queue 408 by itself over communication link 416); and wherein the first processing element 402 receives a response corresponding to the command from the output queue 412. In the event the additional processing element (e.g., processing element #2—404 through processing element #n—406) decides not to issue the command after reserving space, it would return the space previously reserved for the command by writing to a reservation return register, depicted as the return mechanism 434, the amount of space it wishes to return (i.e. increments the reservation register 410 by this amount). Also shown in FIG. 4, another additional processing element 430 that takes the command from the input queue 408 causing the reservation register to increase its available space automatically in hardware 432 by the amount of space now created based on the removal of the command from the input queue. The, the additional processing element 430 executes the command, and notifies the output queue 412 of the execution where it then issues the response to the first processing element 402. In one non-limiting example, the system is implemented as part of a storage area network (SAN) controller. In another non-limiting example, the system is implemented as part of a network attached storage (NAS) controller.

Figure 5:
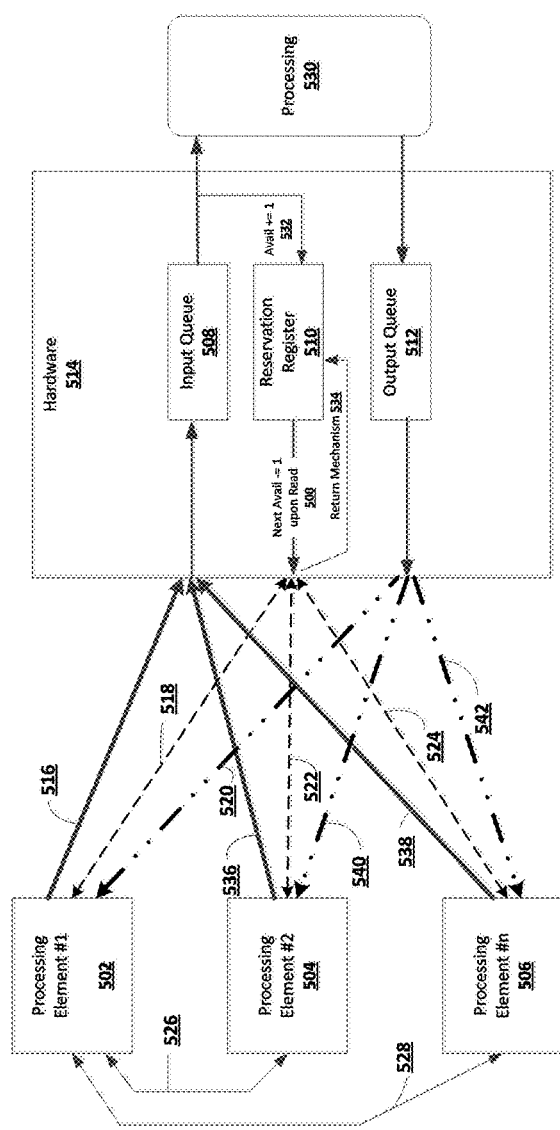

In one embodiment, as depicted in FIG. 5, the present invention provides a system for dividing and synchronizing a processing task across a plurality of processing elements comprising: an input queue 508 implemented in hardware 514; an output queue 512 also implemented in hardware 514; a first processing element 502 having access to the input queue 508 (over communication link 516) and the output queue 512 (over communication link 520); one or more additional processing elements (e.g., processing element #2—504 through processing element #n—506) optionally in communication with the first processing element 502 (depicted by inter-processor communication link 526 between processing element #1 502 and processing element #2 504 and depicted by inter-processor communication link 528 between processing element #1 502 and processing element #n 506) (while FIG. 5 depicts a simplistic link 526 or 528 between two processing elements, it should be noted that there may be other components disposed along this path, where such components may not be used to limit the scope of the present invention) and having access to the input queue 508 (over communication links 536 and 538) and the output queue 512 (over communication links 540 and 542); a reservation register 510 implemented in hardware 514 storing a value indicative of available space in input queue 508, the reservation register 510 accessible by both the first processing element 502 (over communication link 518) and one or more additional processing elements (e.g., processing element #2—504 through processing element #n—506) (e.g., over communication links 522 and 524); computer storage storing instructions, which when executed by one of the additional processing elements (e.g., processing element #2—504 through processing element #n—506): accesses the reservation register 510 and reads the stored value; the stored value automatically decremented in hardware by 1 in concert with the read to make a reservation of space 500; determines when the read value indicates available space in the input queue 508 to issue a command; issue the command to the input queue 508 (this may be optionally done on behalf of the first processing element 502 or the first processing element can issue the command (or another command) into the input queue 508 by itself over communication link 516); and wherein the first processing element 502, or the one or more additional processing elements 504 or 506, receives a response (over communication links 520, 540 or 542) corresponding to the command from the output queue 512. In the event the additional processing element (e.g., processing element #2—504 through processing element #n—506) decides not to issue the command after reserving space, it would return the space previously reserved for the command by writing to a reservation return register, depicted as the return mechanism 534, the amount of space it wishes to return (i.e. increments the reservation register 510 by this amount). Also shown in FIG. 5, another additional processing element 530 that takes the command from the input queue 508 causing the reservation register to increase its available space automatically in hardware 532 by the amount of space now created based on the removal of the command from the input queue. The additional processing element 530 then executes the command, and notifies the output queue 512 of the execution where it then issues the response to the first processing element 502. In one non-limiting example, the system is implemented as part of a storage area network (SAN) controller. In another non-limiting example, the system is implemented as part of a network attached storage (NAS) controller.

The above-described features and applications can be implemented as software processes that are specified as a set of instructions recorded on a computer readable storage medium (also referred to as computer readable medium). When these instructions are executed by one or more processing element(s) (e.g., one or more processors, cores of processors, or other processing elements), they cause the processing element(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing element and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on/within the circuit itself. In some implementations, such as with FPGAs, software may be used to describe hardware circuits, an example of which are FPGA programming files. Such FPGA programming files may also include computer programs, machine code, microcode, firmware, and other software. The FPGA programming files may be stored within an FPGA, ASIC, computer-readable storage media, machine-readable media, or machine-readable storage media.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Those of skill in the art will appreciate that other embodiments of the disclosure may be practiced in network computing environments with many types of computer system configurations, including personal computers, hand-held devices, multi-processor systems, ASIC-based systems, FPGA-based systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a system and method for dividing and synchronizing a processing task across multiple processing elements/processors in hardware. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system for dividing and synchronizing a processing task across a plurality of processing elements comprising:
a first processing element having access to a reservation system;
a second processing element in communication with one of the first processing element or the reservation system;
the reservation system comprising a first register and a second register, the second register mirroring the first register, the reservation system configured to determine when a command can be issued to an input queue, wherein access to the second register does not modify available free space in the input queue;
computer storage storing instructions, which when executed by the second processing element:
determines, via access of the second register, when there is available space in the input queue for the first processing element to issue the command; and
wherein the first processing element receives notification regarding issuing the command.

2. The system of claim 1, wherein access to the first register modifies available free space in the input queue.

3. The system of claim 1, wherein the system is part of a storage area network (SAN) controller.

4. The system of claim 1, wherein the system is part of a network attached storage (NAS) controller.

5. The system of claim 1, wherein the reservation system determines when a command can be issued based on a value indicative of available space in the input queue.

6. The system of claim 1, wherein the reservation system includes a software resource shared by the first processing element and the second processing element.

7. A system for dividing and synchronizing a processing task across a plurality of processing elements comprising:
a first processing element having access to a reservation system;
at least one second processing element in communication with the first processing element;
the reservation system accessible by both the first processing element and the at least one second processing element, the reservation system comprising a first register and a second register, the second register mirroring the first register, the reservation system configured to determine when a command can be issued to an input queue, wherein access to the second register does not modify available free space in the input queue;
computer storage storing instructions, which when executed by the second processing element:
determines, via access of the second register, when there is available space in the input queue for the first processing element to issue the command; and
wherein the first processing element receives notification regarding issuing the command.

8. The system of claim 7, wherein access to the first register modifies available free space in the input queue.

9. The system of claim 8, wherein the system is part of a storage area network (SAN) controller.

10. The system of claim 7, wherein the system is part of a network attached storage (NAS) controller.

11. The system of claim 7, wherein the reservation system determines when a command can be issued based on a value indicative of available space in the input queue.

12. The system of claim 7, wherein the reservation system includes a software resource shared by the first processing element and the second processing element.

13. The system of claim 7, wherein the input queue is implemented in hardware.

14. A method for dividing and synchronizing a processing task across a plurality of processing elements, comprising:
detecting, at a first processing element, a command to be issued, the command associated with a second processing element;
determining if there is available space in an input queue by accessing a first register, the accessing of the first register does not modify available free space in the input queue;
issuing a reservation for the command responsive to the determining, wherein the reservation is accomplished through accessing a second register, the second register mirroring the first register; and
issuing the command from the second processing element responsive to determining the reservation has issued.

15. The method of claim 14, wherein the issuing the reservation is achieved through the first processing element.

16. The method of claim 14, wherein accessing the second register modifies available free space in the input queue.

17. The method of claim 14, wherein determining the reservation has issued is achieved through one of a notification pushed to the second processing element or the second processing element detecting the issuing of the reservation.

18. The method of claim 14, wherein the method is executed through a network attached storage controller.

19. The method of claim 14, wherein determining the reservation has issued includes receiving a response from an output queue coupled to the input queue.

20. The method of claim 14, wherein the determining if there is available space is based on a value in the first register.

\* \* \* \* \*